Oct. 2, 1951     C. W. VAN SCHOYCK     2,569,590
EXPANSIBLE AND CONTRACTIBLE WHEEL
HUB AND CLAMPING MEANS THEREFOR
Filed Feb. 3, 1948

Carl W. Van Schoyck
*INVENTOR.*

BY *James A. O'Brien
and Harvey B. Jacobson*
               *Attorneys*

Patented Oct. 2, 1951

2,569,590

UNITED STATES PATENT OFFICE 2,569,590

EXPANSIBLE AND CONTRACTIBLE WHEEL HUB AND CLAMPING MEANS THEREFOR

Carl W. Van Schoyck, Waterloo, Iowa

Application February 3, 1948, Serial No. 6,114

1 Claim. (Cl. 301—128)

The present invention relates to a novel and improved tractor wheel and axle assembly and has more particular reference to adjustable clamping means for the wheel hub, whereby said wheel may be shifted longitudinally on the axle for required adjustment purposes.

It is a matter of common knowledge that during planting, the rows of crops are set and spaced at variable distances from each other. Because of this, it is repeatedly necessary to regulate and adjust the rear drive wheels of the tractor so that they may be moved toward or from each other to accommodate the space existing between the crop rows. The purpose of the present invention is to adjustably connect each wheel by keying the hub portion of same on a suitably splined axle. More specifically, and in accordance with the invention, the hub of the tractor wheel is provided with a protuberance and this is longitudinally slotted to provide segmental grips, there being a clamping collar provided and said collar being mounted for clamping adjustment on said protuberance.

Manifestly, it is an object of the invention to provide a tractor wheel of the aforementioned character which may be readily and easily adjusted in such a way as to conserve time and to reduce labor necessary to accomplish the job.

In carrying out the principles of the invention, I have evolved and produced a simple, practical and satisfactory hub and clamp arrangement which is aptly suited to attain desired ends and is an appreciable contribution to this line of endeavor.

Other objects, features and advantages will become more readily apparent from the following description of the accompanying illustrative drawings.

In the drawings, wherein like numerals are employed to designate like parts throughout the views.

Figure 4:
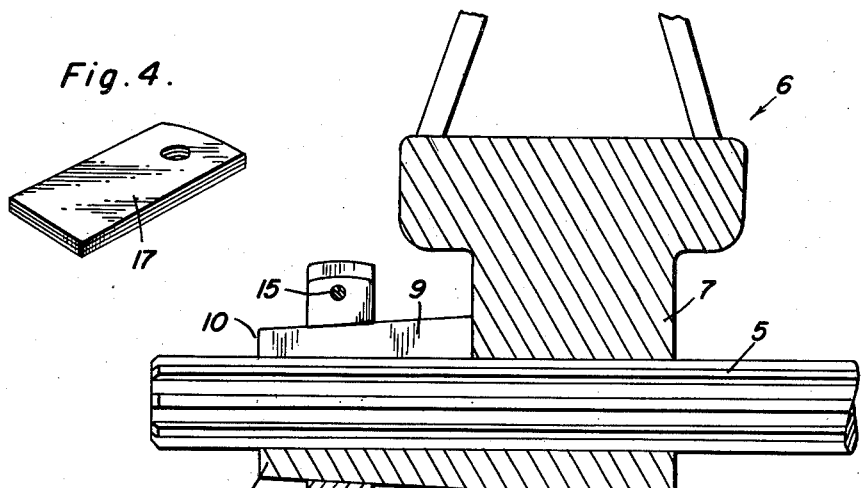
Figure 4 is a perspective view of the shims which I employ in the completed construction.

Referring now to the drawings by distinguishing reference numerals, the numeral 5 designates a rear drive shaft for a coacting tractor wheel 6. The shaft is splined and the hub 7 is grooved in a well-known manner to permit said hub to be slidably keyed on the shaft. In accordance with the present invention, the hub is provided with an outstanding protuberance 8 and this is provided with equidistant, circumferentially spaced, longitudinal slots 9 defining complemental sectors 10. Externally, the protuberance is slightly tapered. The surfaces defining the bore of the protuberance are grooved to fit the ribs or splines on the drive shaft.

Figure 1:
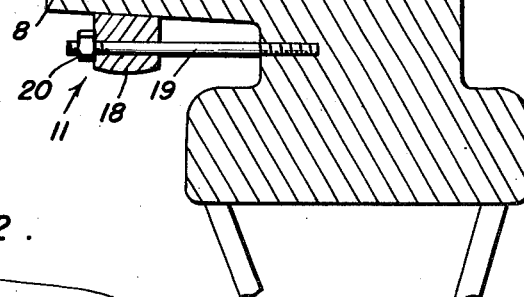
Figure 1 is a view in section and elevation, the view being of a fragmentary type, and disclosing an adaptation constructed in accordance with the principles of the present invention.
Figure 2:
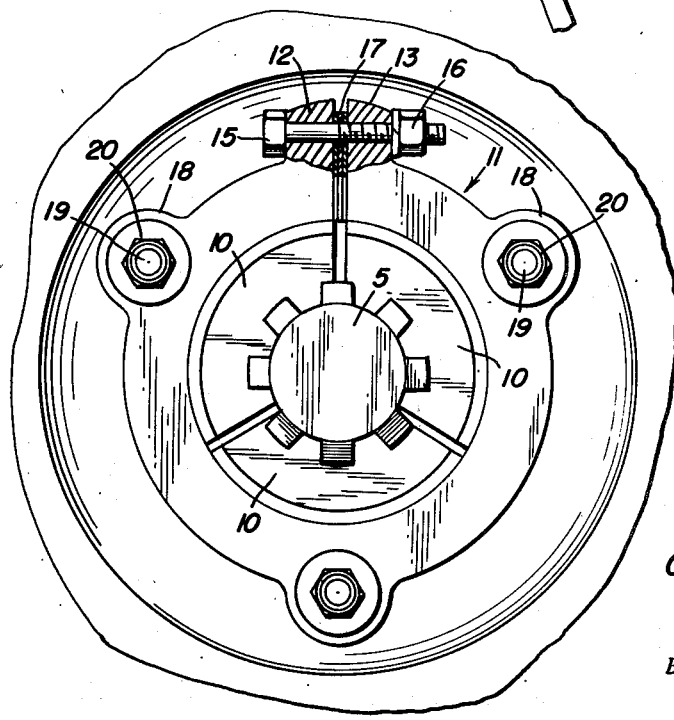
Figure 2 is an end view, also fragmentary in character, observing the structure of Figure 1 in a direction from left to right.
Figure 3:
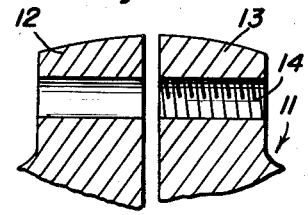
Figure 3 is a fragmentary detail section.

The clamping collar is denoted by the numeral 11 and this is primarily of annular form and embraces and serves to squeeze and tighten the sector-shaped jaws 10 into clamping relation with the axle, in an obvious manner. The collar is of a split type and the adjacent ends are formed with outstanding lugs 12 and 13. The lugs are apertured and one is screw-threaded, as at 14, to accommodate the threads on the shank of the clamping bolt 15. The latter is held in place by lock nut means 16. The numeral 17 designates shims which are interposed between the movable ends of said collar. At circumferentially spaced points the collar is provided with outstanding bosses 18 and these serve to accommodate threaded end portions of studs 19 secured to the hub proper, as shown in Figure 1. The exposed threaded ends of said studs carry retaining nuts 20, as illustrated. By slipping the collar up on the tapered surfaces of the grips or jaws 10, the latter are bound securely into clamping relation with the splined shaft. Then the nuts 20 are tightened, as is obvious. The collar may be slipped from left to right in Figure 1, or from right to left, depending on requirements to make way for regulation of the collar and desired clamping results.

When it is necessary to adjust the hub, it is essential to loosen the clamping means, as is obvious. This means loosening the nut means 16 on the bolt 15 and perhaps entirely removing the bolt. Then shims are either removed or supplemented, depending on the adjustment required. It is generally necessary to insert a suitable tool between the collar-ends to spread same apart for purposes of releasing the clamping action and to facilitate making the required adjustment.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A vehicle axle, wheel and wheel adjusting and fastening assembly comprising, in combination, a supporting and driving axle having an extending end portion which is uniform in diameter from end to end and is provided with circumferentially spaced longitudinally extending splines, a tractor wheel embodying a grooved hub slidably keyed on the splines on said axle, the outer normally accessible side of said hub having an outstanding boss, the latter being likewise grooved and slidably keyed on the splines on said axle, being longitudinaly slotted, externally tapered and forming a plurality of expansible and contractible wheel adjusting and clamping jaws, a split clamping collar surrounding and longitudinally slidable on the tapered surfaces of said jaws, said collar being in the form of a ring which is of rectangular cross-section, the inner peripheral surface of said ring being tapered to conform with the tapered surfaces of said jaws, the outer peripheral surface of said ring being provided, on opposite sides of the split with radially outstanding lugs, selectively insertable and removable shims mounted between the adjacent surfaces of said lugs, bolt and nut means, the bolt thereof piercing said lugs and shims, the inner flat surface of said ring being spaced a substantial distance from the adjacent surfaces of the hub to permit an instrument to be inserted in the space for prying and sliding the ring in a direction away from said hub, said lugs being adapted to permit an instrument to be inserted therebetween, after the bolt is removed, to allow the ring to be expanded for insertion and removal of shims and for adjustment purposes, and circumferentially spaced studs carried by and projecting from said hub, said studs being parallel to said axle, and said ring being slidably mounted on said studs, the outer accessible ends of the latter being screw-threaded and provided with assembling and retaining nuts coacting with the ring.

CARL W. VAN SCHOYCK.

REFERENCES CITED

The following references are of record in the file of this patent:

UNITED STATES PATENTS

| Number | Name | Date |
|---|---|---|
| 929,762 | Hess | Aug. 3, 1909 |
| 1,790,737 | Alborn | Feb. 3, 1931 |
| 2,123,533 | Johnston | July 12, 1938 |